United States Patent [19]
Mehnert

[11] 3,844,220
[45] Oct. 29, 1974

[54] MAGNETIC SUSPENSION AND SWITCHING FOR VEHICLES

[75] Inventor: Walter Mehnert, Ottobrunn, Germany

[73] Assignee: Messerschmitt-Bolkow Blohm GmbH, Munich, Germany

[22] Filed: Dec. 26, 1972

[21] Appl. No.: 318,233

[30] Foreign Application Priority Data
Dec. 23, 1971 Germany.......................... 2164157

[52] U.S. Cl....... 104/148 MS, 104/130, 104/148 SS
[51] Int. Cl............................................ B61b 13/08
[58] Field of Search......... 104/148 MS, 148 SS, 130

[56] References Cited
UNITED STATES PATENTS
3,590,743  7/1971  Larson.................................. 104/88
3,662,689  5/1972  Kawabe et al................. 104/148 SS Primary Examiner—M. Henson Wood, Jr.
Assistant Examiner—George H. Libman
Attorney, Agent, or Firm—Woodhams, Blanchard and Flynn

[57] ABSTRACT

A traffic system utilizing a magnetic repulsive system to support a vehicle on a rail. The guide system for the vehicle permits the vehicle to move from a condition wherein there is little or no gap between the track and the vehicle to a condition wherein a required air gap is provided between the track and the vehicle, which change in condition may occur without any substantial reduction in speed.

14 Claims, 12 Drawing Figures

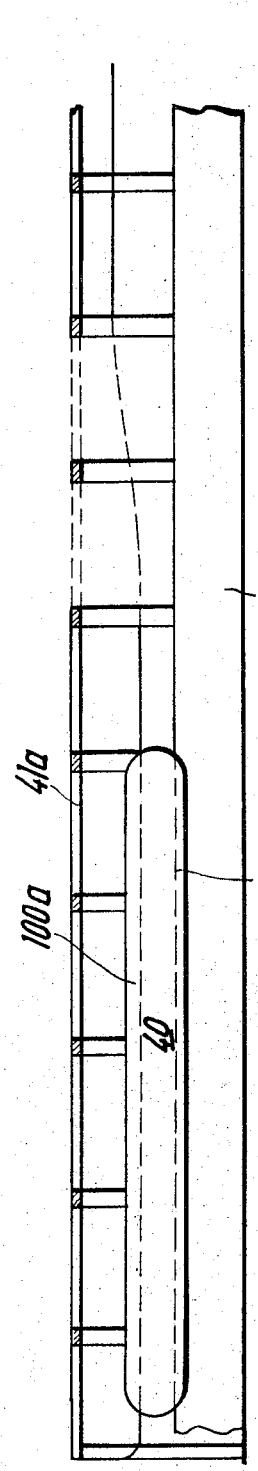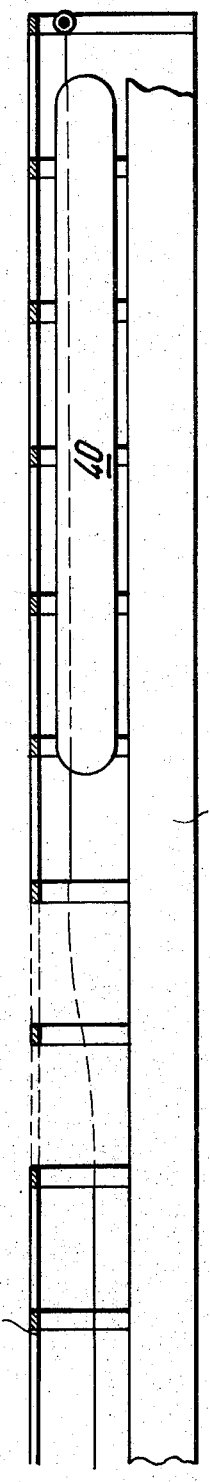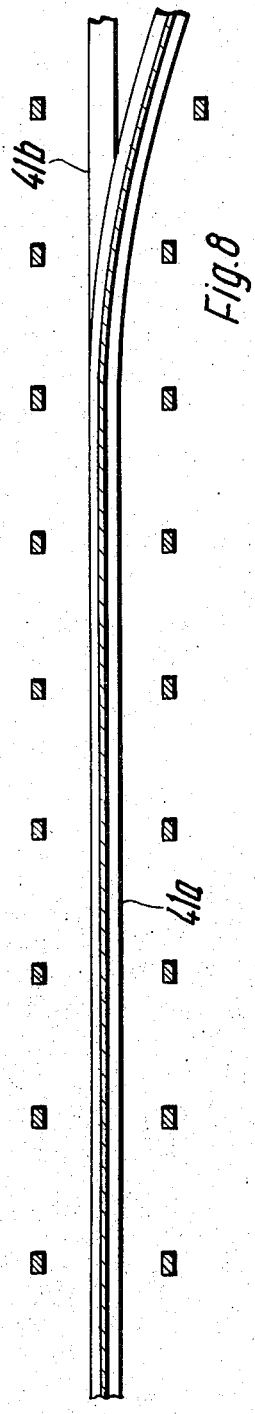

MAGNETIC SUSPENSION AND SWITCHING FOR VEHICLES

FIELD OF THE INVENTION

The invention relates to a traffic system which is based on the basis of a magnetic cushion, preferably a repulsive type system.

BACKGROUND OF THE INVENTION

Such traffic systems are actually already known in various types of construction. Thus a magnetic suspension system for a moving vehicle is part of the state of the art, which magnetic suspension system is coupled to the vehicle and generates an electromagnetic field. A magnet is hereby guided freely suspended and by repulsion which is caused by an induced opposing field. The conducting member may hereby be a normal conductor or a superconductor. The moving magnet induces eddy currents in the conductor, which eddy currents cause the magnets to float through the repulsive force of the magnets at a certain speed. This system has among others the disadvantage that a track change is not possible. The decisive disadvantage is that the entire system is caught in the guides and furthermore all interfering forces attacking from outside take effect here on the vehicle movement due to the structurally determined circumference.

Furthermore, a traffic system has become known which is movable on a flow medium cushion and which is created from a fluidized track. Also this system has many disadvantages, thus among others great losses of medium.

Some arrangements which have become known as part of the state of the art, have a degree of freedom, whereby the track is to be considered the reference system, however, then no longer have a possibility to keep a stable position of equilibrium of constant stability. This means that it is not possible to maintain independently from interfering magnitudes a position of equilibrium defined in small limits. This degree of freedom is in the repulsive system as a rule directed upwardly, in the attractive system downwardly.

Further arrangements do not have any degree of freedom, therefore, however, the possibility to better hold the position of equilibrium. However, these arrangements have the disadvantage that they do not have any possibilities to give way for the vehicle. Furthermore, the possibility to better hold the position of equilibrium is strongly limited by coupling the guide systems through the primarily effective middle magnet.

Furthermore, an arrangement became known which uses the degree of freedom in a repulsive system in order to leave the line in an upward direction or again to drive from above onto the track.

Aside from the fundamental deficiencies as they are described above for arrangements with degrees of freedom, this solution is bought through a considerable mechanical expense. This expense exists mainly because the traffic system is being changed mechanically in its form by for example extending a fin. This is the reason why such a suggestion has not yet been made in magnetic cushion vehicles with high speeds, aside from the fact through the extended fin a considerable, hardly controllable upward lift pressure is created and the system therefore can make the track change only at a low speed. In magnetic cushion vehicles which are based on electrodynamic repulsion and in which the track is inactive, this disadvantage of the reduced speed is so great that such a solution is fundamentally questionable. A further important disadvantage of this system consists in that the extendable fin is subjected to the entire weight of the complete traffic system through which the train weight is very limited. The concept described by the solution contradicts the purpose to transport loads of large volume and therefore remains limited to cabin-train-similar systems for small speeds and transporting capacities.

The purpose of the invention is to design a traffic system which permits a large transporting capacity at high speeds and makes possible track change also at constant high speeds without mechanical changes within the train and/or rail system. This purpose is attained in such a manner that the conducting and support system of the vehicle member represents one single system unit — the guide system — and is constructed and arranged in such a manner that the vehicle member is transferred without — or only with an unimportant — speed reduction from a first condition into a second condition, preferably from a standing into a hanging condition and vice versa, whereby between the guide system or the guide systems in the train and the track in the vertical there is always provided a space defining a rectilinear air gap $\delta$.

Through this measure a traffic system is created the stability of which can be identified as an optimum and is almost independent from outside influences. Furthermore it is now possible that the train can be lifted from or lowered in the rail without speed reduction and without mechanical arrangements.

Furthermore, it is suggesteed that the guide system consists of two times two magnetic systems which are arranged at a certain angle $\beta$ with respect to the vertical, and through this the upper magnetic system has supporting and conducting characteristics and the lower magnetic system has conducting and additionally stabilizing characteristics. This measure makes it possible to hold the stability also during a path change under strong outside influences.

In a further exemplary embodiment, it is suggested that the vehicle member is provided with several, preferably two, active guide systems, for example, with each one at the upper and at the lower part of the vehicle member, whereby with these active guide systems preferably at the switch points corresponding passive guide systems are associated in the line.

It is also provided that both active and also passive guide systems are arranged on the vehicle member and the correspondingly oppositely formed guide systems are associated with the rail. This measure makes it possible that the relatively expensive active partial guide systems can be used at an expense optimum by limiting it to only local use.

A special exemplary embodiment provides that in the rail and vehicle member, active guide systems are opposite one another and are associated with one another, preferably at switch points. Through this it is achieved that these points can be passed with any desired low speed. Furthermore, it is generally possible to reduce the expense, for example, of the active system in the train considerably.

In particular, it is furthermore suggested that through the two magnetic systems which form the guide system, the magnetic stiffness can be adjusted variably by the lower magnetic system adjustably increasing the speed of the vehicle member. This measure permits that the oscillation amplitude of the vehicle member, caused by the interfering magnitudes, is adjustable and most importantly can be kept small.

Furthermore, it is suggested that the air gap which is permeated by the magnetic induction assumes an angle $\beta$ preferably $\beta = \alpha = 45°$ with respect to the vertical. Only through this measure it is made possible that a vertical spacing defining a rectilinear air gap is produced and furthermore that the conducting and support system can be constructed as one single system unit.

Furthermore, it is provided that the magnetic system of the guide system consist in the train and/or track of superconducting coils which are constructed advantageously of triangularly or roof-shaped cross section wherein the sides are at an angle of inclination $\beta$ to the coil axis of preferably 45° and the coil outside diameter increases with an increasing distance from the air gap at the angle $\beta$. Through these measures, it is achieved that the field decay is kept small from the inner edge to the outer edge of the coil. The outer edge of the coil increases in diameter relative to inner diameter and the angle between the inner wall and the other wall of the coil is the angle $\beta$. Furthermore, through this the field strength in direction of the coil axis is kept at a maximum with respect to exceeding the critical field strength in the coil. Furthermore, with this it is achieved that through the so-created coil geometry, the room available in the train is at an optimum.

In one exemplary embodiment, it is provided that the space defining a rectilinear vertical air gap is formed only in the zone of a switch so that additional magnets can be arranged in the track. These measures make it possible so that in the normal case the vehicle can move with a small air gap thereby resulting in small magnetic usage in the train and only in the switch zone where the vertical degree of freedom is required, the air gap is brought to the required size through additional activation in the rail. From this results a minimization of power usage and expense.

The invention is described and illustrated in connection with exemplary embodiments in the drawings, in which:

FIG. 6 is a schematic side view of the traffic system at a switch point;

FIG. 7 is a side view of the traffic system, while the train member is lifted out from the line at the switch point;

FIG. 8 is a top view of the line according to FIG. 7 without illustration of the train;

Figure 1:
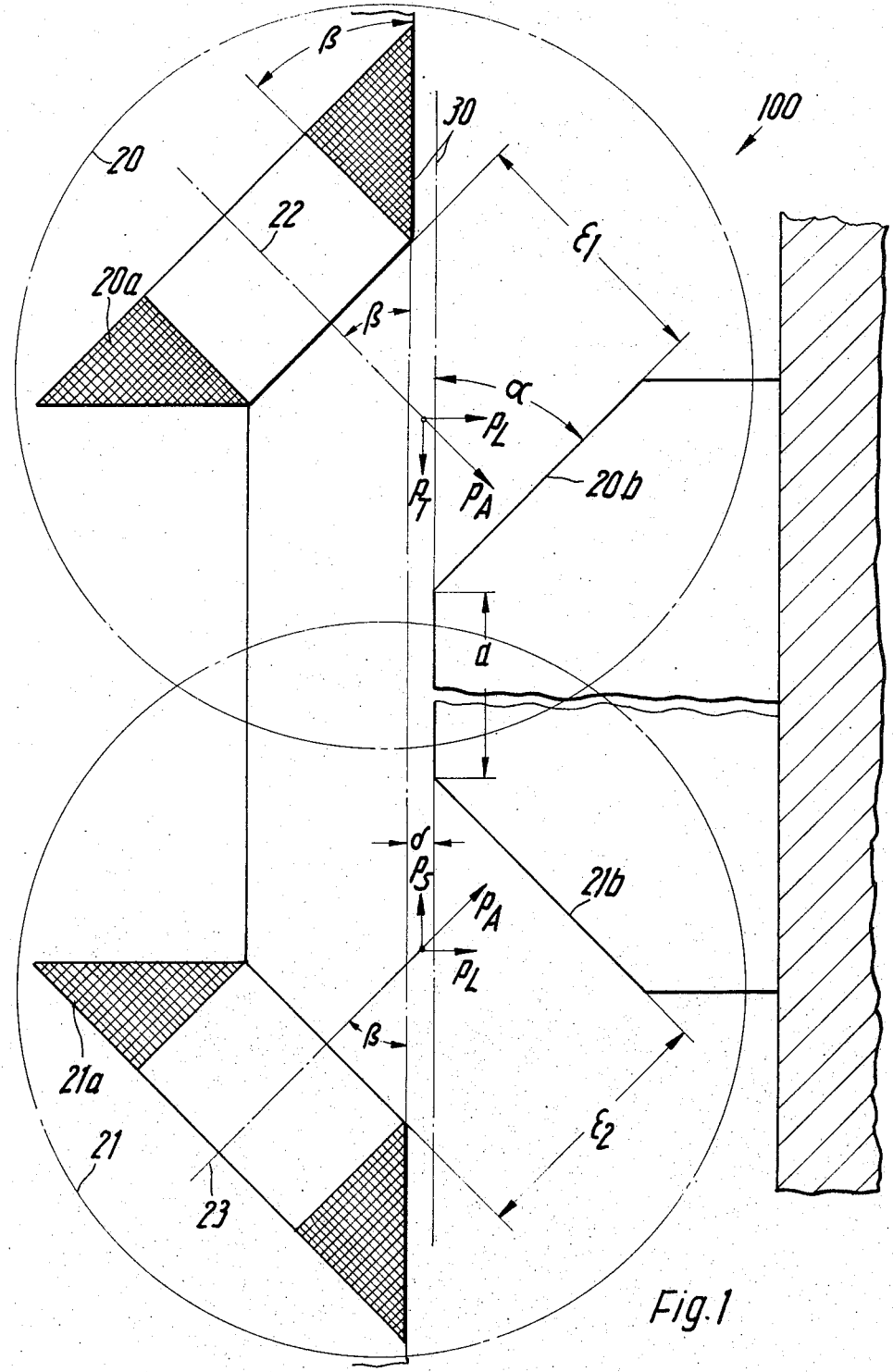
FIG. 1 is a schematic cross-sectional view of the basic principle.

FIG. 1 schematically illustrates the basic principle of the guide system which will be defined as follows: entire guide system 100 is composed of one conducting (i.e. guiding) and support system 20 and one conducting (i.e. guiding) and stabilizing system 21 per side of a vehicle. Both systems 20, 21 consist each of an active (coil part) part 20a, 21a and a passive part 20b, 21b. Between the corresponding active 20a or 21a and passive 20b or 21b part systems there is provided an induction air gap $\epsilon_1$ or $\epsilon_2$ which depends on the strength of the magnetic fields created by the active parts. Between the active and the passive systems there is provided a spacing defining a vertical rectilinear air gap $\delta$ which is determined by the construction e.g. weight of the train and by the field strengths of the magnets. The angle of inclination $\alpha$ of the guide surface 20b to the vertical 30 is preferably 45°, the angle $\beta$ is the angle between the coil axes 22 and 23 of the active system 20a and 21a, respectively, and the vertical 30. The dividing line in the drawing in the passive system 20b, 21b indicates that this system must not consist of one unit. The minimum distance $a$, which is obtained from the distances between the points of intersection of the guide surfaces 20b, 21b with the vertical 30, depends on the field strengths of the coils and the depth of penetration in the passive system. The support and conducting characteristics of the aforedescribed system are created in that through the magnetic field of the active part 20a, 21a in direction of the coil axes 22 and 23, respectively, in dependency from the vehicle speed in the passive part 20b, 21b an opposing field is induced, the lines of force of which cooperate with the ones of the active part in such a manner that a repulsive force is created. This repulsive force is broken up for example through the angle $\alpha = \beta = 45°$ according to the force parallelograms into equally sized support and conducting components (for parts 20a, 21a) and equally sized conducting and stabilizing component components (for parts 20b and 21b). The traffic system can for example be driven in a conventional manner by a linear motor.

Figure 2:
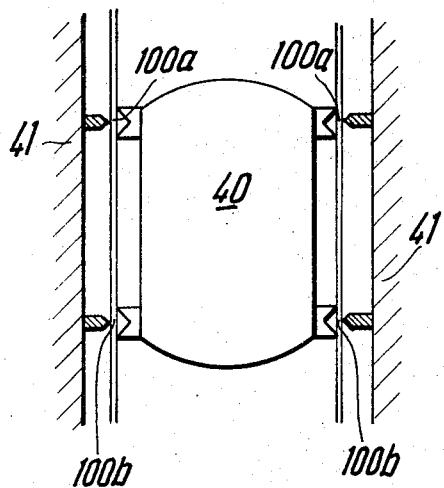
FIG. 2 is a schematic cross-sectional view of an embodiment of the traffic system, whereby all magnets are in the train.

FIGS. 2 through 5 illustrate exemplary embodiments for the arrangement of the active guide system parts (corresponding to parts 20a and 21a in FIG. 1) and passive guide system parts (corresponding to parts 20b and 21b in FIG. 1) of a guide system 100 on the vehicle 20 and on the rail 41. FIG. 2 shows in detail an arrangement of the guide systems 100a and 100b on the side walls of the vehicle 40 in which all active parts are exclusively on the vehicle 40 and all passive parts in the rail 41.

Figure 3:
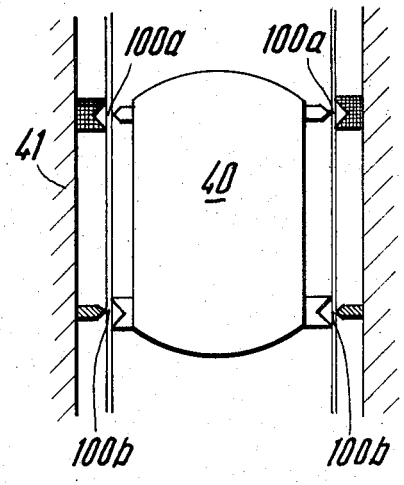
FIG. 3 is a cross-sectional view of a further embodiment in which the magnets are partly in the train, partly in the track.

In FIG. 3 in the entire upper guide system 100a, the active part is now in the rail 41 and the passive part on the vehicle 40. Exactly the opposite arrangement exists on the lower guide system 100b. In general for all exemplary embodiments, the use of two entire guide systems 100 is true, which permits leaving of the track and again driving into the track which is done by activating the switch system (on top and on the bottom) and deactivating the corresponding track system 41. Depending on the chosen embodiment of the entire traffic system, through this the transition from a standing into a hanging condition and vice versa takes place. "Standing" is hereby a condition in which the center of gravity of the vehicle 40 lies above the suspension point, in the "hanging" condition the center of gravity lies below the suspension point. It is understood that only in locally limited track sections — for example in switch zones — the double arrangement of two complete entire guide systems 100 is used. This means that for one normal track travel only one entire guide system 100 is required which again permits it that over the greatest track length only one track guide must be provided.

Figure 4:
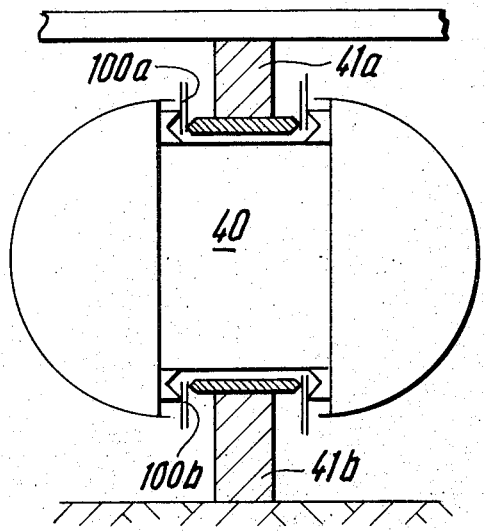
FIG. 4 is a cross-sectional view of a third exemplary embodiment in which the magnets are arranged in the train.

In FIG. 4 a further exemplary embodiment of the invention is illustrated which permits a different construction of the vehicle member. This arrangement has the special advantage to permit an extremely space-saving rail construction. The same is also true for the embodiment according to FIG. 5 even if not to the same extent. Both rail constructions 41 according to FIGS. 4 and 5 are suitable particularly for a two-lane arrangement corresponding to a double-track system of the usual railroad constructions.

Figure 5:
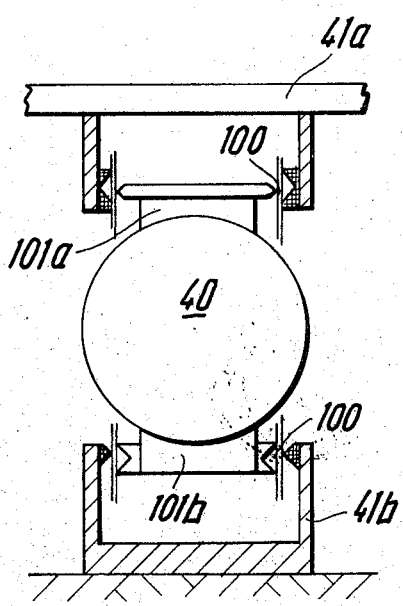
FIG. 5 is a cross-sectional view of a fourth exemplary embodiment in which the magnets are arranged partly in the train and partly in the track.

FIG. 5 shows a further exemplary embodiment in which the entire guide systems 100 are arranged concentrated on top and bottom on the vehicle member 40. This embodiment increases on one side the usability of the traffic system in such a manner that it is possible to separate the vehicle member 40 from the entire guide and drive systems and to carry out for example a container or so-called composite traffic, on the other side this embodiment makes possible an important construction simplification with respect to the vehicle member design and the absorption of the considerable forces.

FIGS. 6 through 9 schematically illustrate the inventive traffic system at the place of a switch or rather the locally limited construction where two entire guide systems 100 (e.g., an upper system 100a and lower system 100b) are needed. In FIG. 6, the entrance portion of a switch is illustrated which guides the vehicle 40 away upwardly by activating the entire guide system 100a and deactivating the entire guide system 100b.

FIG. 7 shows the phase in which the vehicle 40 is located completely in the switch and has left the preceding track 41b.

FIG. 8 schematically illustrates in a top view the switch arrangement according to FIGS. 6 and 7, whereby the constructive structure of the line in general is not shown.

Figure 9:
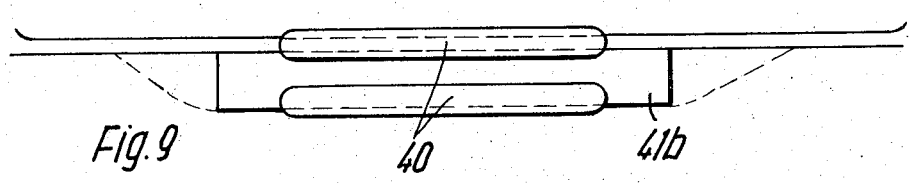
FIG. 9 is a side view of the rail guide of the traffic system in a station.

FIG. 9 illustrates the exemplary embodiment of a station in which the vehicle member 40 is guided away downwardly. During passage over the station in the illustrated example, the train 40 is guided above, while the drive may remain further in the lower rail 41b.

Figure 10:
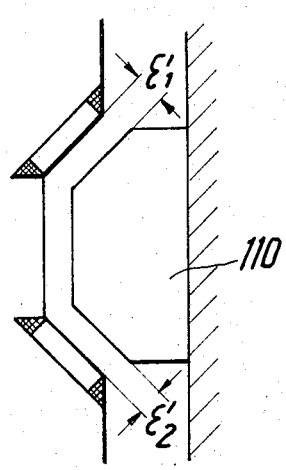
FIG. 10 is a cross-sectional view of the guide system while traveling along a line and without a vertical spacing defining an air gap.
Figure 11:
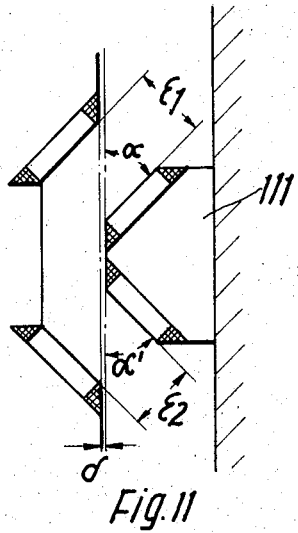
FIG. 11 is a cross-sectional view of the guide system according to FIG. 10 while passing a switch.
Figure 12:
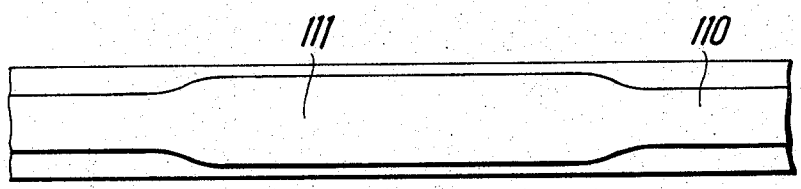
FIG. 12 is a top view of the switch according to FIGS. 10 and 11 without the illustration of the train.

FIGS. 10 through 12 illustrate the special case that during a normal track travel, travel takes place at a reduced air gap $\epsilon'$ (giving up the rectilinear air gap $\delta$) (FIG. 10). In the zone of a switch (FIG. 11) the rectilinear vertical air gap $\delta$ which is required for leaving the track is achieved by arranging additional active sections of the guide system on the track 111. FIG. 12 illustrates this arrangement in a top view, whereby the track portion 110 corresponds to the small distance, the switch 111 to the large distance.

The embodiments of the invention in which exclusive property or privilege is claimed are defined as follows:

1. A traffic system of the magnetic cushion type, particularly for using repulsive magnetic forces, comprising a guide system provided as a single uint for both magnetically guiding and magnetically supporting a vehicle on a track having a guide system part on said vehicle and a magnetically coacting guide system part on said track and means spacing said parts by a through extending, vertical, rectilinear air gap $\delta$ for enabling transfer of the vehicle from a standing condition to a hanging condition and vice versa with respect to the track without significant vehicle speed reduction.

2. A traffic system according to claim 1, in which the guide system comprises an upper magnetic system having supporting and guiding characteristics and a lower magnetic system having guiding and stabilizing characteristics, one such upper magnetic system and one such lower magnetic system being provided for each side of the vehicle, each magnetic system comprising a pair of magnetically coacting elements arranged oppositely from each other at a predetermined angle $\beta$ with respect to the vertical, said upper and lower magnetic system elements on one side of said air gap defining said track guide system part and the elements on the other side of said air gap defining said vehicle guide system part.

3. A traffic system according to claim 2, in which said opposed elements of the upper magnetic system lie on a first axis and said elements of the lower magnetic system lie on a second axis, said axes converging, wherein the one of said upper and lower magnetic systems generates a vertical force component for supporting the vehicle and the other determines the stiffness of the magnetic cushion, whereby the magnetic stiffness can be adjusted to compensate for changes in vehicle weight.

4. A traffic system according to claim 1, in which the vehicle is provided with an active upper guide system part adjacent the upper portion thereof and an active lower guide system part adjacent the lower portion thereof, said track having switch points, corresponding upper and lower passive track guide system parts being provided at said switch points in operatively opposed relation to the upper and lower active vehicle guide system parts, respectively.

5. A traffic system according to claim 1, in which opposed portions of the track guide system part and vehicle guide system part define a magnetic system, said magnetic system including a superconducting coil on at least one of said vehicle and track, said coil being substantially roof-shaped wherein the peripheral wall of said coil has an angle of inclination $\beta$ to the axis of such coil, the coil outside diameter increasing with increasing distance from said air gap to define such angle $\beta$, wherein $\beta = 45°$.

6. A traffic system according to claim 5 in which said magnetic system further includes a guide surface opposed to said coil across said air gap, said guide surface having an angle $\alpha$ to the vertical, wherein $\alpha = 45°$.

7. A traffic system according to claim 1, in which said guide system includes both active and passive elements, said vehicle having guide system parts incorporating both active and passive elements, said track having guide system parts incorporating passive and active elements opposed to elements of opposite kind on said vehicle.

8. A traffic system according to claim 1, in which the track includes a switch point and said track is provided with active guide system parts at such switch point, said vehicle having active guide system parts opposed to said active track system parts, said opposed parts being operatively associated for supporting said vehicle for travelling past said switch point of said track.

9. A traffic system according to claim 1, in which opposed elements of said vehicle guide system part and track guide system part define an induction air gap therebetween having an axis extending between the opposed faces of a corresponding vehicle element and track element, said opposed faces having an angle $\alpha$ to the vertical and said induction air gap axis having an angle $\beta$ to the vertical, where $\beta = \alpha = 45°$.

10. A traffic system according to claim 1, in which the vehicle is further provided with a drive system and wherein the vehicle guide system part and vehicle drive system define a unit separable from the vehicle.

11. A traffic system according to claim 1 wherein said track comprises at least one zone for normal running and at least one switch zone for switching the vehicle from track to track, said track guide system part being spaced from said vehicle guide system part to establish said vertically extending rectilinear air gap therebetween at said switch zone such that opposed elements of said track guide system part and vehicle guide system part are axially spaced by a relatively wide induction air gap, said opposed elements of said track guide system part and vehicle guide system part being axially spaced by a relatively narrow induction air gap in said running zone wherein no vertical rectilinear air gap is formed between the track and vehicle guide system parts, said rectilinear vertical air gap at said switch zone enabling said vehicle to be shifted vertically with respect to said track without mechanical interference between adjacent track and vehicle guide system parts, elimination of said vertical rectilinear air gap in said running zone wherein no switching of said vehicle from track to track is required enabling reduction of the magnetic field strength between said opposed vehicle and track guide system elements required for supporting and guiding of said vehicle.

12. A traffic system of the magnetic cushion type, particularly for using repulsive magnetic forces to support and guide a vehicle for movement along a track, comprising upper and lower guide systems for guiding and supporting the vehicle with respect to the track in, respectively, a hanging condition and a standing condition and being actuable to enable transfer between such conditions, each said guide system having parts fixed on the vehicle and opposed magnetically coacting parts fixed on the track, said track including a running zone and a switch zone, the spacing between said track mounted parts and corresponding vehicle mounted parts being relatively large in said switch zone to define a through going, vertical rectilinear air gap disposed therebetween and spacing said vehicle from said track laterally to enable vertical shifting of said vehicle with vertical removal of one guide system vehicle mounted parts from opposed relation with the corresponding track mounted guide system parts by vertically bending the track mounted parts of the other guide system away from said first mentioned track mounted guide system parts to enable switching, the lateral spacing between coacting track mounted parts and vehicle mounted parts being decreased in said running zone to eliminate said through going vertical rectilinear air gaps in such running zone and without requiring movability of such parts on the vehicle or track, so as to minimize field strengths of magnetic fields appearing between opposed coacting track mounted and vehicle mounted guide system parts.

13. A traffic system according to claim 12 in which each guide system includes an oppositely directed pair of said vehicle mounted parts and an oppositely directed pair of said track mounted parts, wherein one track mounted part and vehicle mounted part is provided for each side of the vehicle, said oppositely directed track mounted parts having a first spacing in said running zone, said opposed track mounted parts having a second and greater spacing in said switching zone, the difference between such first and second spacing providing a one of said through going vertical rectilinear air gaps in said switching zone between each opposed set of vehicle mounted and track mounted parts of a guide system and including means for increasing the magnetic field strength between the opposed track mounted and vehicle mounted parts of each set of a given guide system in said switch zone to compensate for such increased spacing therebetween.

14. A traffic system according to claim 12 in which one of the parts of a said guide system comprises a pair of electrically energizable coils having convergent axes and the other part comprises means opposed thereto and magnetically coacting therewith, one of said pair of coils providing a vehicle guiding and supporting field and the other said coil providing a vehicle guiding and stabilizing field, said supporting and stabilizing fields comprising oppositely directed vertical field components, said stabilizing field component being variable to adjust the magnetic stiffness of the vehicle suspension.

* * * * *